(12) United States Patent
Lin et al.

(10) Patent No.: US 7,659,649 B2
(45) Date of Patent: Feb. 9, 2010

(54) FAN AND MOTOR THEREOF

(75) Inventors: Yung-Ping Lin, Taoyuan Hsien (TW); Dung-Chang Yeh, Taoyuan Hsien (TW); Xiao-Lin Ma, Taoyuan Hsien (TW); Ying-Xi Hu, Taoyuan Hsien (TW); Yong Duan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 15 days.

(21) Appl. No.: 11/969,101

(22) Filed: Jan. 3, 2008

(65) Prior Publication Data
US 2008/0169733 A1    Jul. 17, 2008

(30) Foreign Application Priority Data
Jan. 11, 2007    (TW) ............................. 96101100 A

(51) Int. Cl.
*H02K 7/08* (2006.01)
(52) U.S. Cl. ..................... 310/90.5; 310/67 R

(58) Field of Classification Search .................. 310/90, 310/90.5, 67 R
See application file for complete search history.

(56) References Cited

U.S. PATENT DOCUMENTS

| | | | | |
|---|---|---|---|---|
| 4,755,709 A * | 7/1988 | De Jager | .................... | 310/90.5 |
| 5,610,462 A * | 3/1997 | Takahashi | .................... | 310/90 |
| 7,023,119 B2 * | 4/2006 | Doemen | .................... | 310/90.5 |
| 7,315,100 B2 * | 1/2008 | Chen et al. | ................. | 310/90.5 |
| 7,498,704 B2 * | 3/2009 | Otsuki et al. | ............... | 310/90.5 |
| 2005/0184609 A1 * | 8/2005 | Chen et al. | ................. | 310/90.5 |

* cited by examiner

*Primary Examiner*—Dang D Le
(74) *Attorney, Agent, or Firm*—Birch, Stewart, Kolasch & Birch, LLP

(57) ABSTRACT

A fan includes a motor and an impeller. The motor drives the impeller to rotate and includes a base, a bearing, a stator, a rotor and a magnetic element. The central portion of the base is extended to form a bushing for accommodating the bearing therein. The stator telescopes around the bushing. The rotor is disposed corresponding to the stator and has a shaft passing through the bearing. The magnetic element is disposed at the bottom of the bushing and located adjacent to one end of the shaft.

1 Claim, 6 Drawing Sheets

FAN AND MOTOR THEREOF

CROSS REFERENCE TO RELATED APPLICATIONS

This Non-provisional application claims priority under 35 U.S.C. §119(a) on Patent Application No(s). 096101100 filed in Taiwan, Republic of China on Jan. 11, 2007, the entire contents of which are hereby incorporated by reference.

BACKGROUND OF THE INVENTION

1. Field of Invention

The invention relates to a fan and a motor thereof and, in particular, to a fan and a motor that can maintain the stability and balance of their rotor.

2. Related Art

When a fan runs, the external force or airflow often acts on the rotor so that it shifts outward. The rotor vibrates up and down so that its balance position changes. The rotor further mechanically interferes with internal or external components of the motor. This results in noises and component erosions. The outward motion of the rotor increases the distance between the rotor and the magnetic sensing element, affecting the sensing effect of magnetic field on the magnetic sensing element.

As shown in FIG. 1, a conventional fan 1 including a motor 10 and an impeller 100 is disclosed for solving this problem. The motor 10 drives the impeller 100 to rotate. The motor 10 includes a base 11, a rotor 12, a bearing 13, a stator 14, a wearproof sheet 17, a circuit board 18 and a Hall element 19. The central portion of the base 11 is extended to form a bushing 111. The wearproof sheet 17 and the bearing 13 are disposed into the bushing 111 in sequence. The stator 14 is telescoped around the bushing 111 and electrically coupled with the circuit board 18. The rotor 12 and the stator 14 are disposed correspondingly. The rotor 12 includes a shaft 121 and a magnetic ring 122. The shaft 121 passes through the bearing 13 and urges against the wearproof sheet 17, and the shaft 121 and the bearing 13 are disposed in the bushing 111. The magnetic ring 122 is disposed and corresponds to the stator 14. The Hall element 19 is used to detect the pole change of the rotor 12.

When the motor 10 drives the impeller 100 to rotate, the external force or airflow pushes the rotor 12 outward. Although the magnetic interaction between the rotor 12 and the stator 14 enables the rotor 12 to stay at a floating balance position during its rotation, the action of the airflow or the switch of the electromagnetic force are likely to let the rotor vibrate up and down so that the balance position of the rotor 12 changes. This causes noises and component erosions, affecting the heat dissipation efficiency and lifetime of the fan 1. To increase the stability of the rotor 12 during rotation, the prior art usually adjusts the distance between the central line of the magnetic ring 122 in the rotor 12 and the central line of the stator 14, i.e. the magnetic bias distance D, to increase the magnetic interactions between the rotor 12 and the stator 14. This helps stabilizing the rotor 12 during rotation.

However, the magnetic bias distance D is only allowed to vary within a certain range, which is not sufficient. Moreover, the large magnetic bias distance D will produce switching noise and increase the distance between the Hall element 19 on the circuit board 18 and the rotor 12. The magnetic field sensed by the Hall element 19 thus decreases. These affect the performance of the motor 10, such as the output current waveform and rotation speed of the motor 10.

SUMMARY OF THE INVENTION

In view of the foregoing, the invention is to provide a fan and a motor thereof that disposed the magnetic element at the bottom of the bushing and adjacent to one end of the shaft. Thus, the magnetic interaction will be generated between the magnetic element and the end of the shaft for stabilizing the rotation balance of the shaft and avoiding the noises and component erosions so as to increase the lifetime thereof.

In view of the foregoing, the invention is also to provide a fan and a motor thereof that minimize the distance between the rotor and the sensing element by increasing the magnetic interactions between the magnetic element and one end of the shaft so as to strengthen the sensing effect of the magnetic field on the sensing element and thus increases the reliability thereof.

To achieve the above, the invention discloses a motor, which includes a base, a bearing, a stator, a rotor and a magnetic element. A central portion of the base is extended to form a bushing. The bearing is disposed in the bushing, and the stator is telescoped around the bushing. The rotor is disposed and corresponds to the stator and has a shaft passing through the bearing. The magnetic element is disposed at a bottom of the bushing adjacent to one end of the shaft.

To achieve the above, the invention also discloses a fan including an impeller and a motor for driving the impeller to rotate. The motor includes a base, a bearing, a stator, a rotor and a magnetic element. A central portion of the base is extended to form a bushing, and the bearing is disposed in the bushing. The stator is telescoped around the bushing. The rotor is disposed and corresponds to the stator and has a shaft passing through the bearing. The magnetic element is disposed at a bottom of the bushing and located adjacent to one end of the shaft.

As mentioned above, the fan and the motor of the invention have the magnetic element disposed at the bottom of the bushing. Through the magnetic interaction between the magnetic element and one end of the shaft, the shaft can rotate stably without increasing the magnetic bias distance, which is the deviation between the central lines of the rotor and the stator. Compared with the related art, the invention can prevent erosions between components and noises, thus increasing the lifetime of the fan and motor thereof. By minimizing the distance between the rotor and the sensing element, the sensitivity of the sensing element on the magnetic field increases, so that the reliability of the fan and the motor thereof can be improved. Moreover, the invention further configures the magnetic isolator in the motor for preventing the magnetic field from affecting the electronic elements in the system. Of course, the wearproof element can be provided to reduce abrasions between the shaft and the magnetic isolator.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
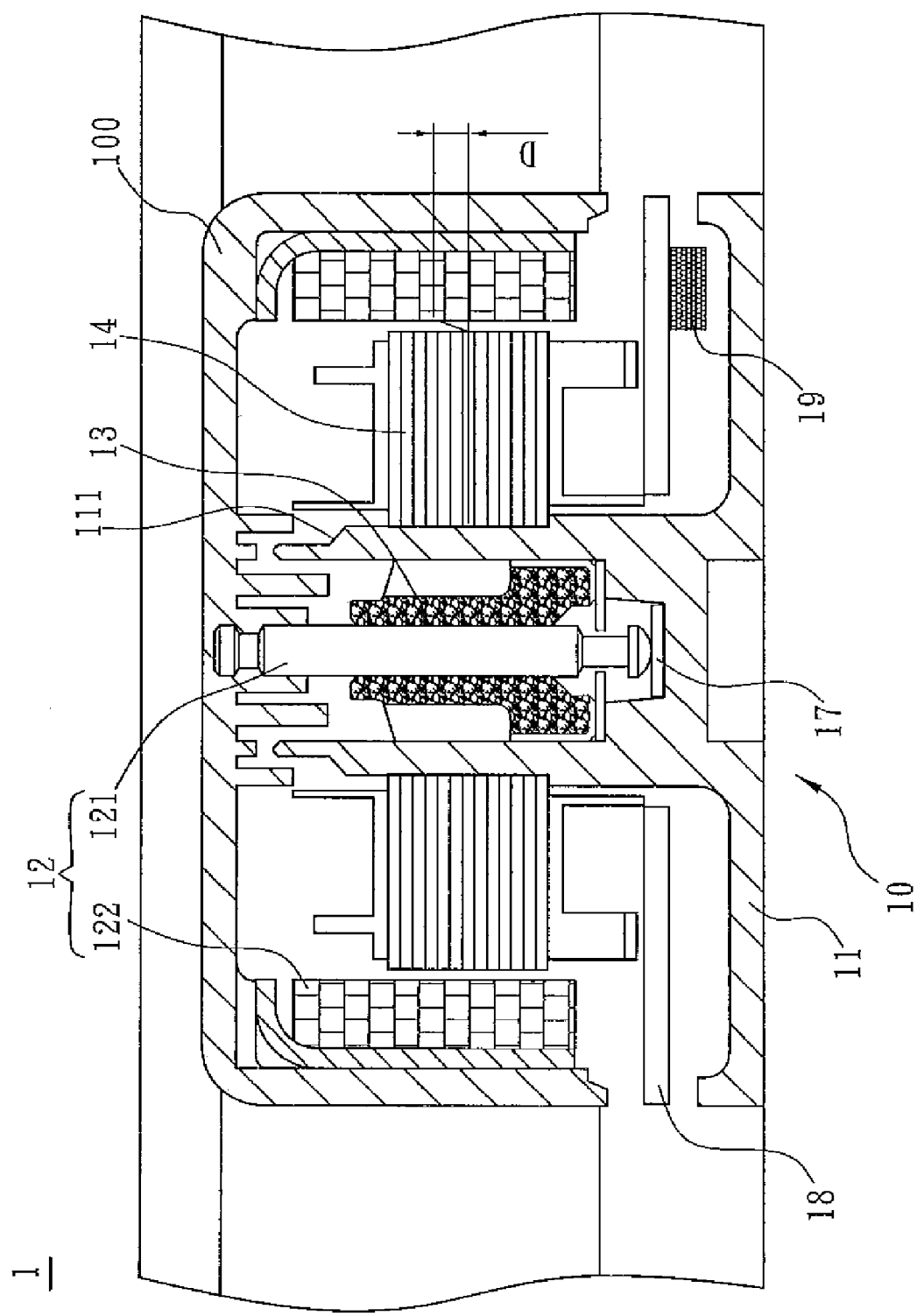
FIG. 1 is a schematic illustration showing a conventional fan and its motor.
Figure 2:
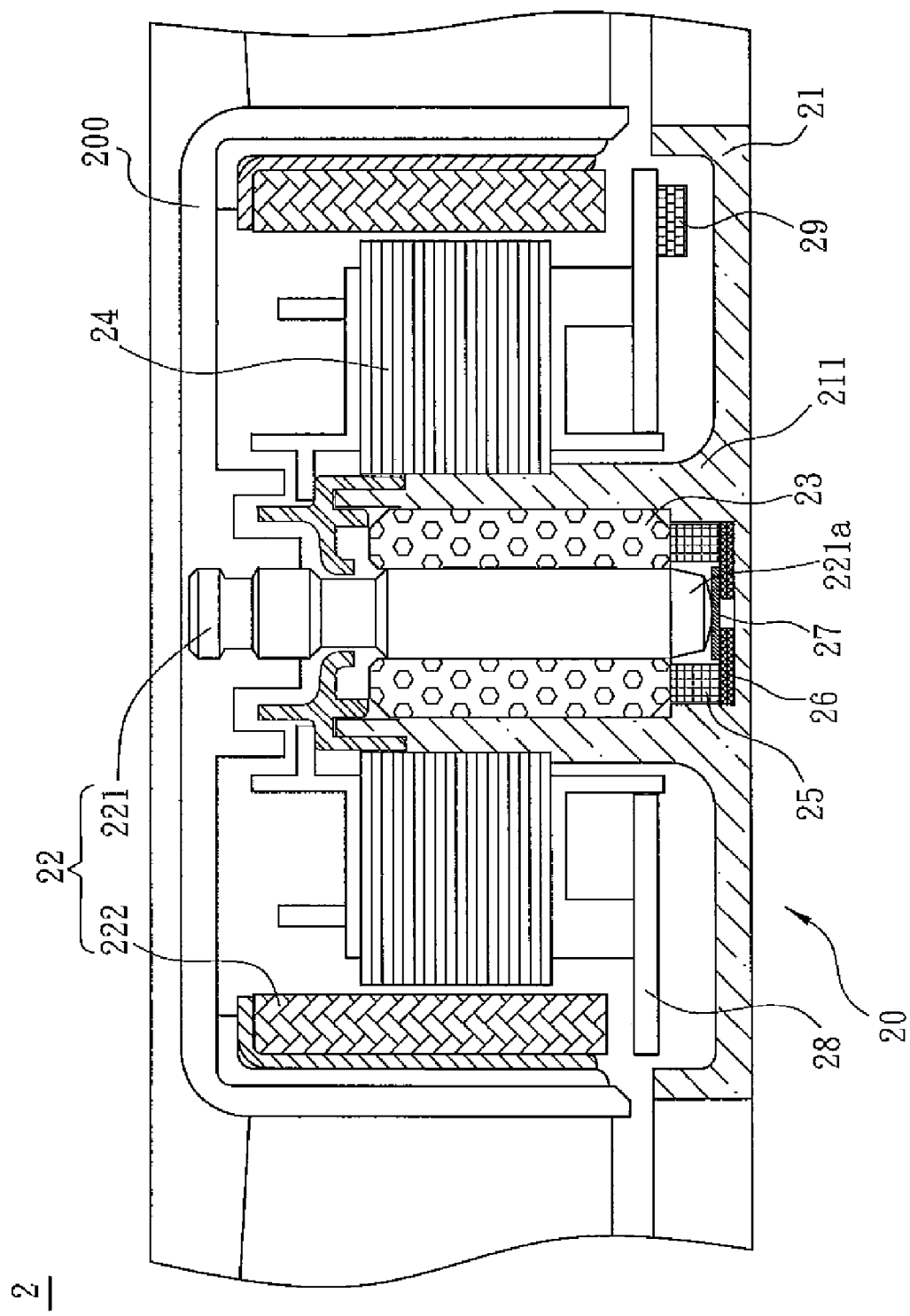
FIG. 2 is a schematic illustration showing a fan and a motor thereof according to an embodiment of the invention.

As shown in FIG. 2, the fan 2 according to an embodiment of the invention includes a motor 20 and an impeller 200. The motor 20 drives the impeller 200 to rotate. The motor 20 includes a base 21, a rotor 22, a bearing 23, a stator 24 and a magnetic element 25. The central portion of the base 21 is extended to form a bushing 211 for accommodating the bearing 23. The stator 24 is telescoped around the bushing 211. The rotor 22 has a shaft 221 and a magnetic ring 222. The magnetic ring 222 is disposed and corresponds to the stator 24. The stator 24 consists of a coil wound around several silicon steel sheets. The shaft 221 passes through the bearing 23. The magnetic element 25 is an annular structure disposed at the bottom of the bushing 211, surrounding one end 221a of the shaft 221 and urging against the bearing 23. The magnetic element 25 is, for example butt not limited to, a magnet, an electromagnetic magnet or a magnetite.

The motor 20 further includes a magnetic isolator 26 and a wearproof element 27 disposed at the bottom of the bushing 211. In this embodiment, the magnetic isolator 26 is a circular sheet, an annular sheet or a cylindrical can adjacent to the magnetic element 25. The magnetic isolator 26 is connected to the bottom of the bushing 211 by the way of, for example, gluing, welding or embedding for supporting the bottom of the magnetic element 25. The wearproof element 27 is disposed on the magnetic isolator 26 and urges against one end 221a of the shaft 221 for reducing abrasions between the shaft 221 and the magnetic isolator 26 or the bushing 211.

The motor 20 further includes a magnetic sensing element 29, such as a Hall element. The magnetic sensing element 29 is disposed under the circuit board 28 and corresponds to the magnetic ring 222 of the rotor 22 for detecting pole changes of the magnetic ring 222 when the rotor 22 rotates.

The functions and effects of the magnetic element 25 will be described as follows. When the fan 2 operates, the external forces or airflow provide the counterforce on the rotor 22, so the rotor 22 is pushed outward. If the rotor 22 is pushed higher than the frame, the balance position between the rotor 22 and the stator 24 may change. In the embodiment, since the magnetic element 25 is disposed around the end 221a of the shaft 221, the magnetic interaction between the magnetic element 25 and the end 221a of the shaft 221 makes the magnetic element 25 tightly adhere to the end 221a of the shaft 221. Not only does the relative balance position of the rotor 22 and the stator 24 remain unchanged, the end 221a of the shaft 221 also does not hit its surrounding components. This can ensure a stable operation of the motor 20. In addition, the magnetic isolator 26 can prevent the magnetic field of the magnetic element 25 from affecting the electronic elements in the system.

Figure 3A:
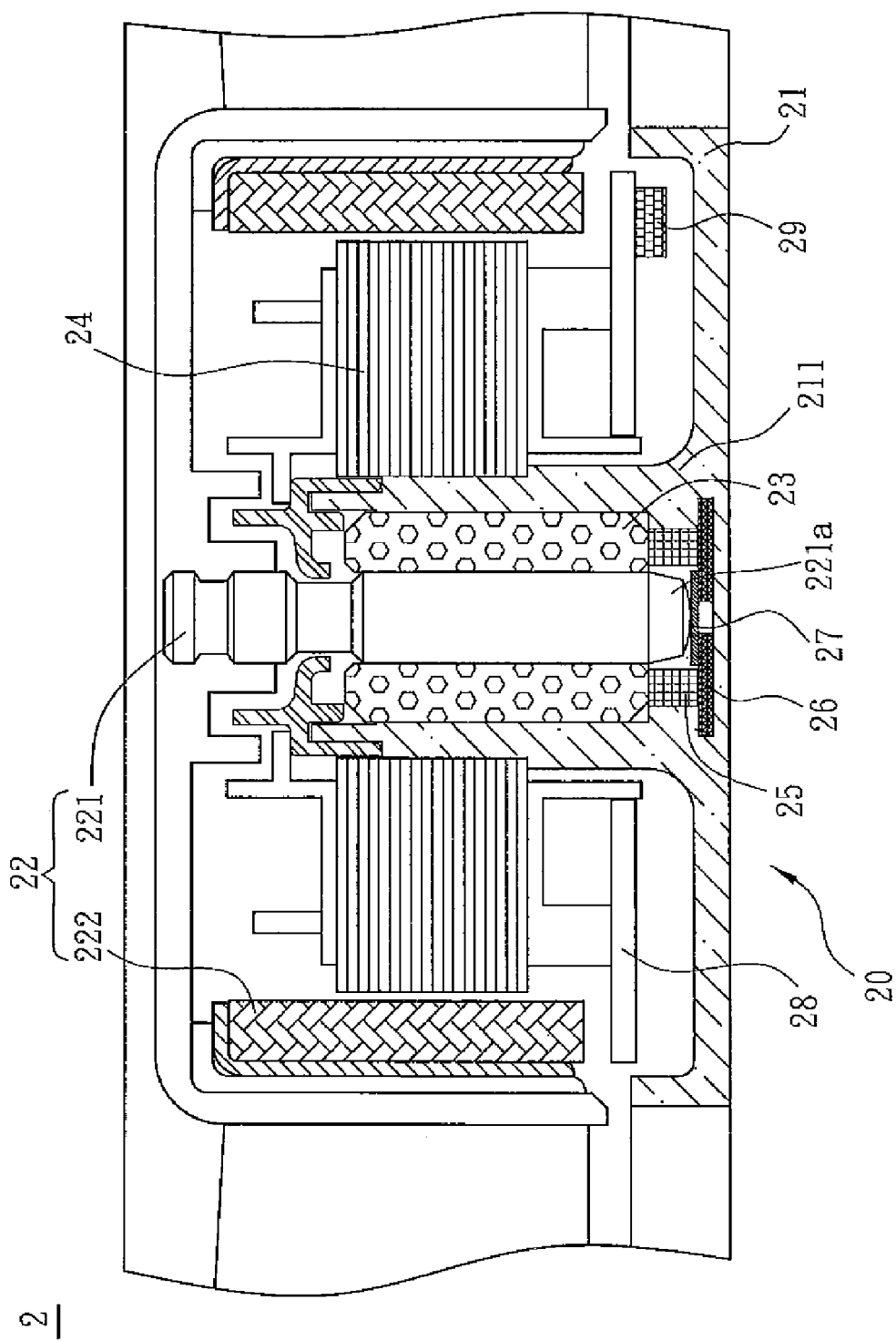
FIGS. 3A to 3D show different aspects of the magnetic isolator and wearproof element in the fan and the motor thereof according to the embodiment of the invention.
Figure 3B:
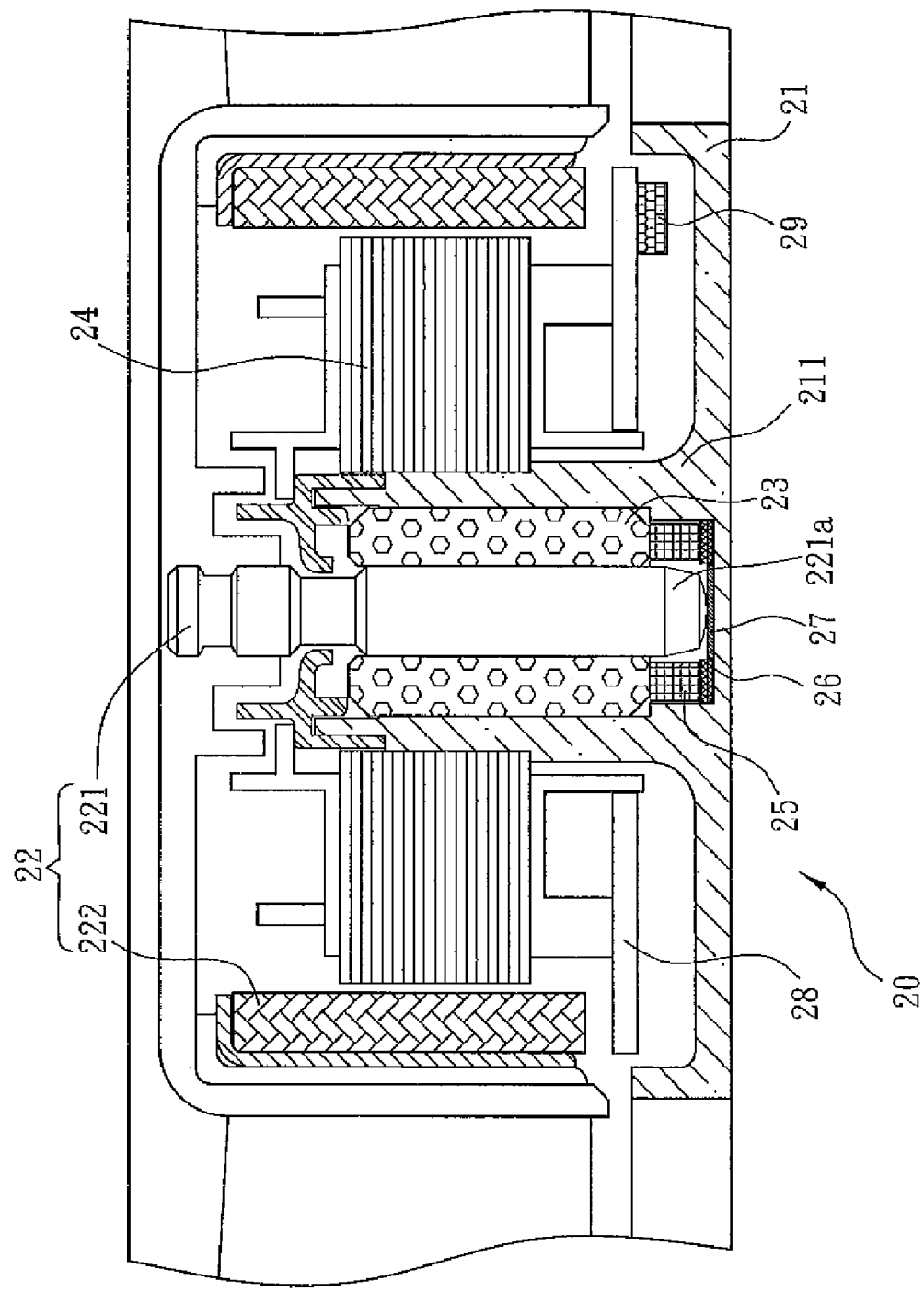
Figure 3C:
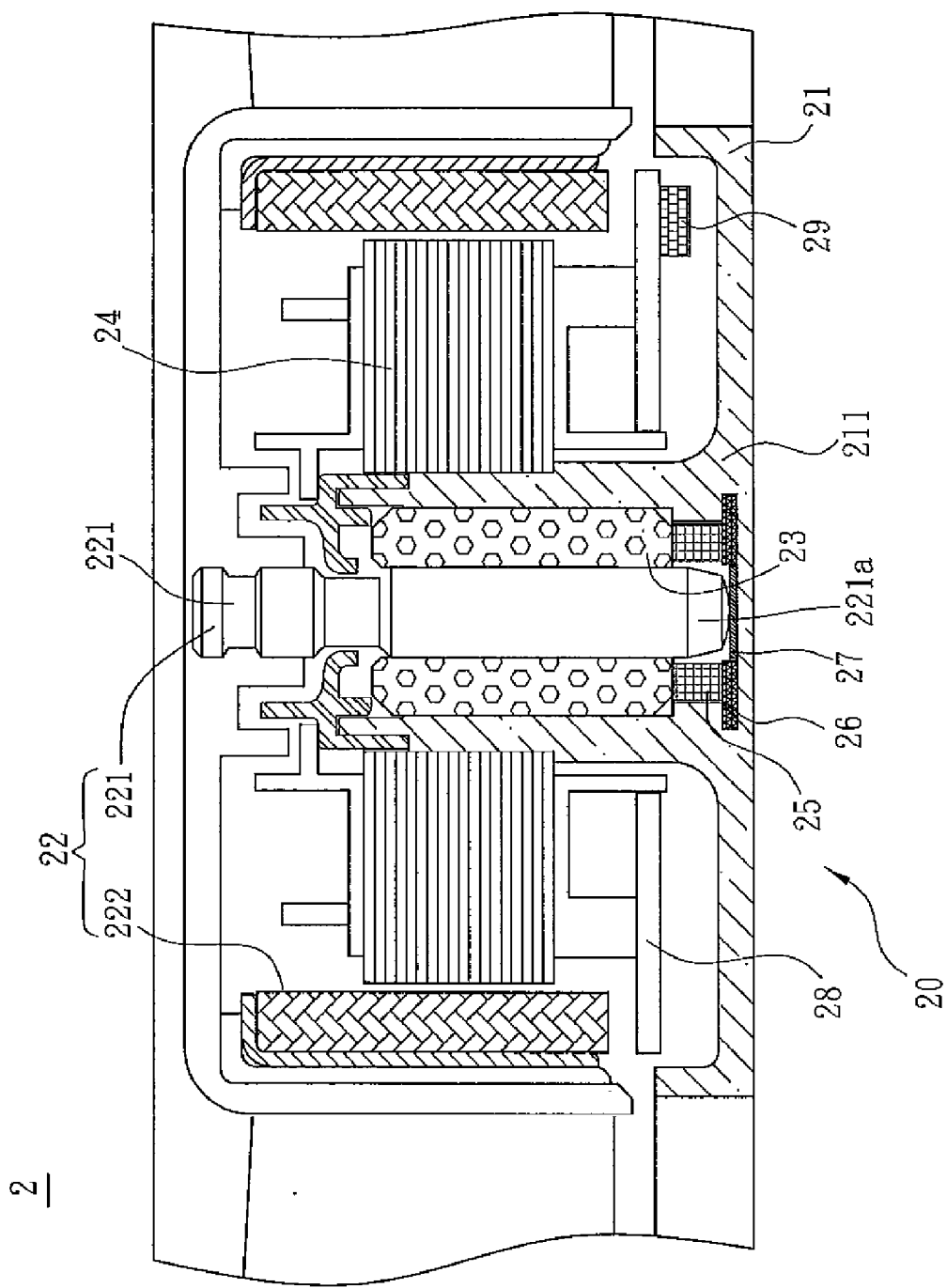
Figure 3D:
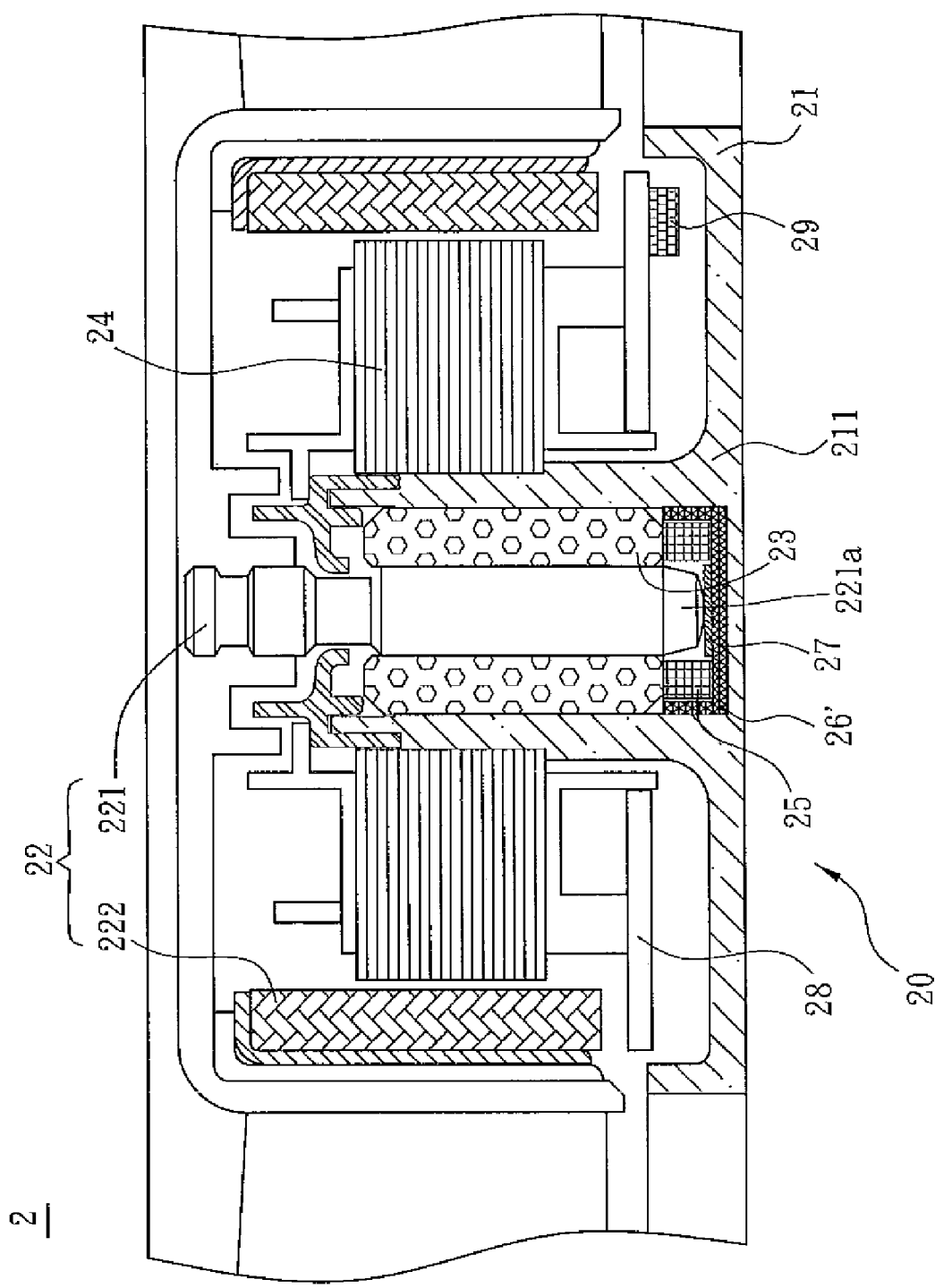

As shown in FIGS. 3A to 3D, the magnetic isolator 26 and the wearproof element 27 can be disposed at the bottom of the bushing 211 in various ways. In FIG. 3A, the magnetic isolator 26 is integrally formed at the bottom of the bushing 211. The top of the magnetic isolator 26 connects to the magnetic element 25 and the wearproof element 27. Alternatively, as shown in FIG. 3B, the wearproof element 27 is integrally formed with the magnetic isolator 26. The wearproof element 27 urges against the end 221a of the shaft 221. The top of the magnetic isolator 26 connects to the magnetic element 25. Alternatively, as shown in FIG. 3C, the magnetic isolator 26 and the wearproof element 27 are integrally formed at the bottom of the bushing 211. In addition to the circular sheet or annular sheet mentioned hereinbefore, the magnetic isolator 26' can be a cylindrical can as shown in FIG. 3D. The cylindrical can is disposed at the bottom of the bushing 211 before it is inserted with the magnetic element 25 and the wearproof element 27. This prevents the magnetic field of the magnetic element 25 from affecting the electronic elements in the system.

In summary, the fan and motor of the invention have the magnetic element disposed at the bottom of the bushing. Through the magnetic interaction between the magnetic element and one end of the shaft, the shaft can rotate stably without increasing the magnetic bias distance, which is the deviation between the central lines of the rotor and the stator. Compared with the related art, the invention can prevent erosions between components and noises, thus increasing the lifetime of the fan and motor thereof. By minimizing the distance between the rotor and the sensing element, the sensitivity of the sensing element on the magnetic field can be increased, so that the reliability of the fan and the motor thereof can be improved. Moreover, the invention further configures the magnetic isolator in the motor for preventing the magnetic field from affecting the electronic elements in the system. Of course, the wearproof element can be provided to reduce abrasions between the shaft and the magnetic isolator.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor comprising:
   a base having a bushing with a closed bottom end;
   a bearing disposed in the bushing;
   a stator telescoped to the bushing;
   a rotor coupled to the stator and having a shaft passing through the bearing;
   a magnetic isolator disposed at the closed bottom end of the bushing;
   a wearproof element disposed at the closed bottom end of the bushing and urging against an end of the shaft without contacting with the single magnetic element; and
   a single magnetic element disposed at the closed bottom end of the bushing and disposed on the magnetic isolator wherein the single magnetic element surrounds the end of the shaft.

* * * * *